Figure 1:
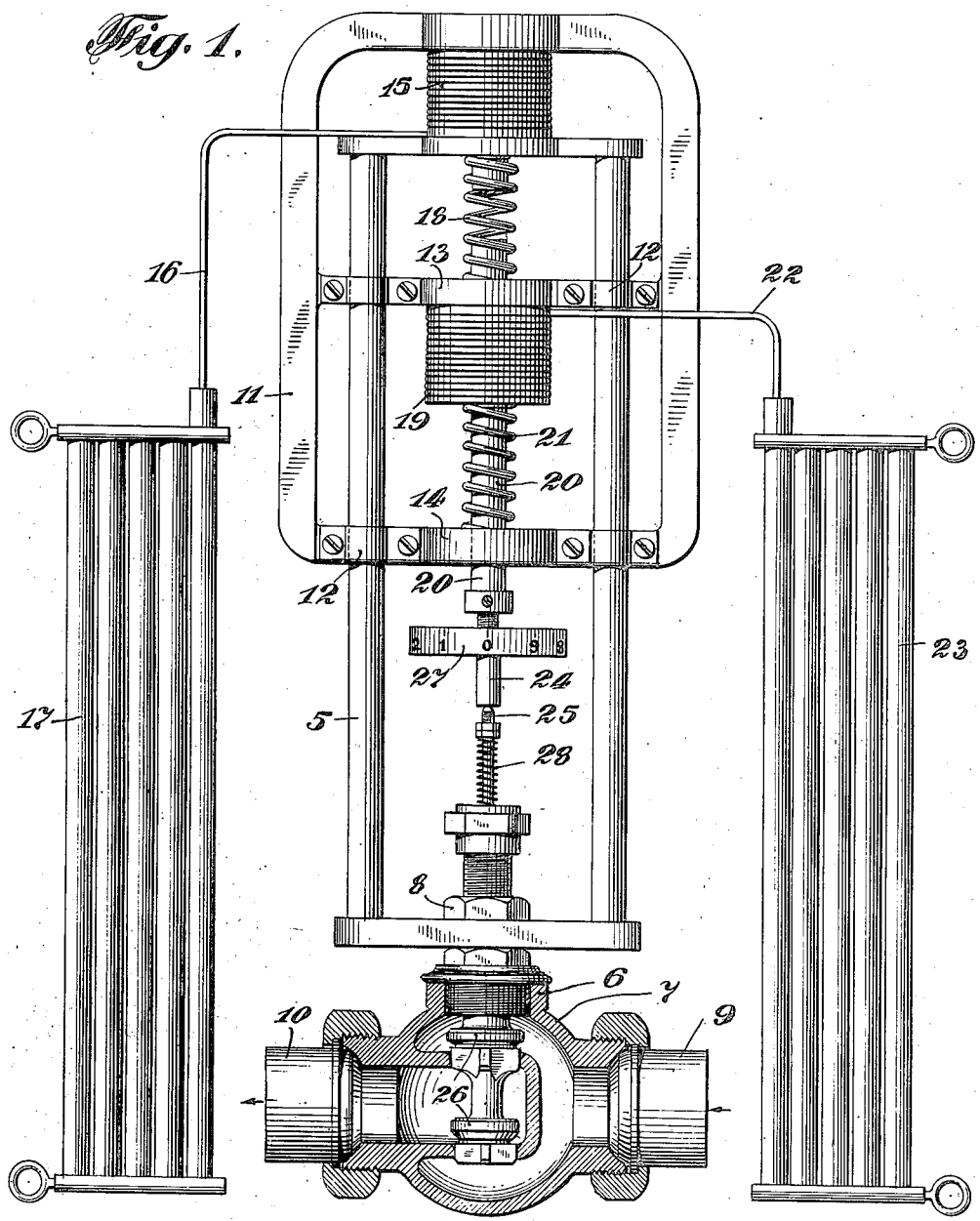

Aug. 5, 1924.  1,504,080

A. ROESCH

AUTOMATIC CONTROLLER

Filed Feb. 26, 1921  3 Sheets-Sheet 1

Inventor

Alfred Roesch

By Bresser Nehreuk his Attorneys

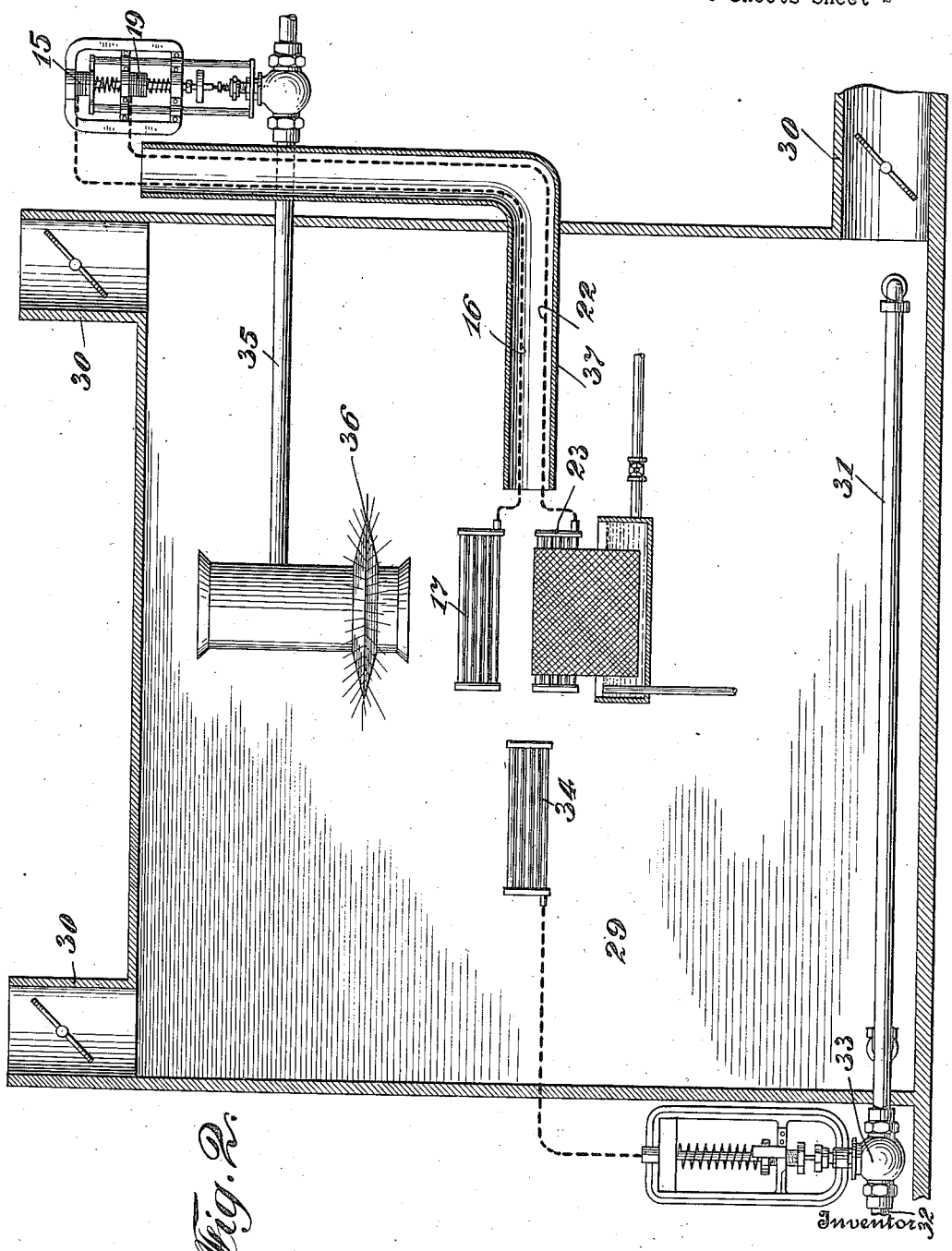

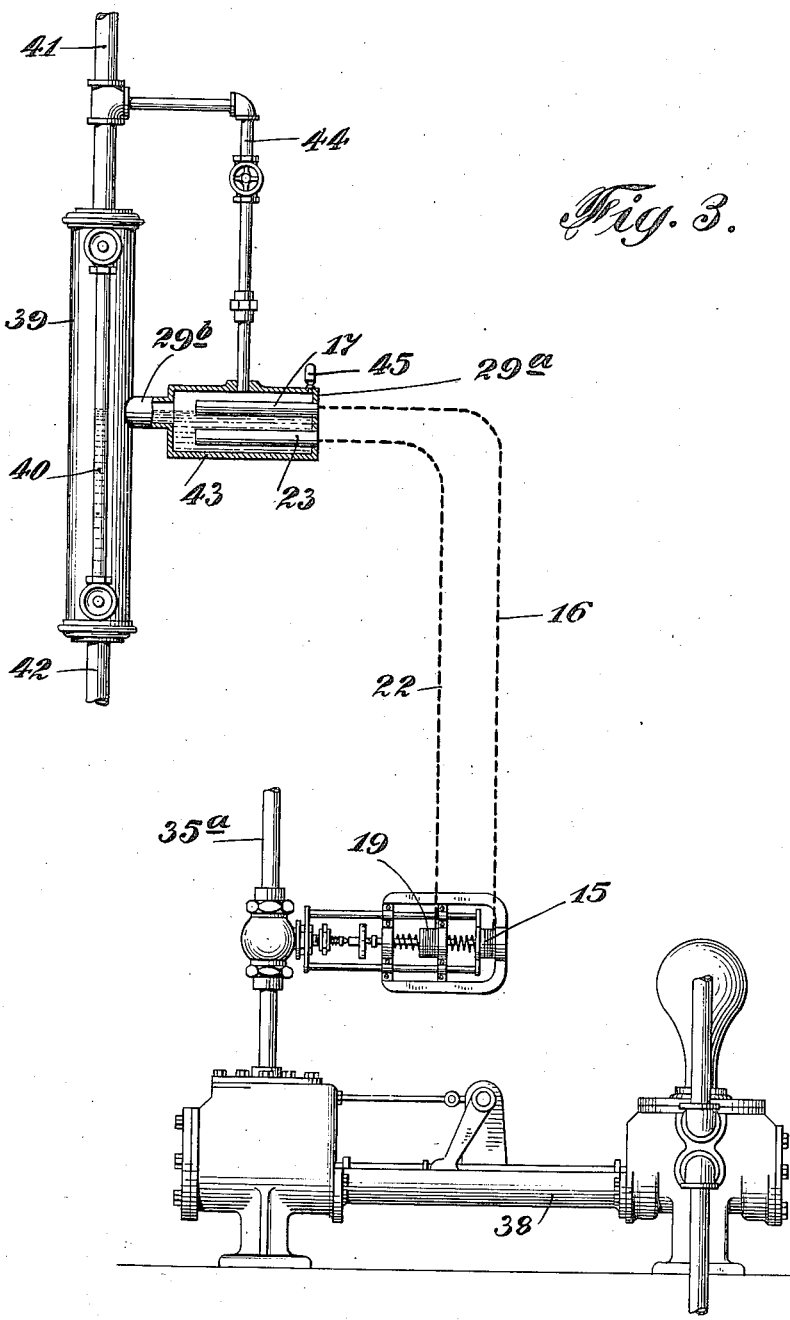

Patented Aug. 5, 1924.

1,504,080

UNITED STATES PATENT OFFICE.

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

AUTOMATIC CONTROLLER.

Application filed February 26, 1921. Serial No. 448,284.

*To all whom it may concern:*

Be it known that I, ALFRED ROESCH, a citizen of the United States, and resident of the borough of Brooklyn, county of Kings, city and State of New York, have invented certain new and useful Improvements in Automatic Controllers, of which the following is a specification.

My invention relates to automatic controllers and has for its object to provide a novel construction which I have termed a differential controller and which includes a plurality of thermostatic or other elements whereby the flow of a fluid is automatically controlled in accordance with changes in said elements resulting from temperature or other variations. A further object of the invention is to provide a device in which each thermostatic or other element is capable of independent operation and in which said elements will co-operate to compensate for any changes in temperature or other conditions which may occur in the vicinity of said elements, thus maintaining the accuracy of the apparatus and preventing said changes from affecting the setting point thereof. Other more specific objects will appear from the description hereinafter and the features of novelty will be pointed out in the appended claims.

In the accompanying drawings which show examples of my invention without defining its limits, Figure 1 is an elevation of the controller; Fig. 2 is a view illustrating an installation in which the controller is used for automatically regulating the percentage of humidity in relation to predetermined temperature, and Fig. 3 is a view illustrating the controller in use for automatically maintaining the water level in a steam boiler at a predetermined constant point.

In describing the invention, it will be assumed that the controller is operatively combined with a valve which may be of any conventional type and used for regulation purposes in any customary manner and which is shown in a specific form simply for illustrative and descriptive purposes and without intent to restrict the field of usefulness of the invention. In the drawings, the controller comprises a support illustrated in the form of a stationary yoke 5 which may be fixed upon the bonnet 6 of the valve casing 7, for instance by means of a lock-nut 8, said valve casing having an inlet 9 and an outlet 10 connected in accordance with the regulation for which the valve is intended. A movable yoke 11 is slidably mounted upon the upright members of the stationary yoke 5 by means of bearings 12 comprising parts of cross-bars 13 and 14 respectively. An operating element comprising a thermo-sensitive member, illustrated in the present instance as a thermostatic bellows 15, is located between and in engagement with the contiguous ends of the yokes 5 and 11 and is connected by means of a capillary tube 16 with a temperature sensitive device comprising a member sensitive to temperature changes and shown in the form of a multi-tubular bulb 17 which, because of its construction, is extremely sensitive to air temperature conditions; it will be understood that the bulb 17 may be replaced by equivalent and other devices, the character of said bulb or its equivalent being determined by the nature and class of work to be performed. A coil spring 18 is located between and in engagement with the end of the stationary yoke 5 and the cross-bar 13 of the movable yoke 11 and exerts a tension tending to collapse the bellows 15. A second operating element also comprising a thermo-sensitive member which, as shown, may also be in the form of a thermostatic bellows 19 has its one end in engagement with the cross-bar 13 of the movable yoke 11 and its other end fixed upon a rod or the like 20 which constitutes an operating member and passes freely through an opening in the cross-bar 14 of said movable yoke 11; a coil spring 21 surrounds the rod 20 and with one end bears against the bellows 19 and with its other end against the cross-bar 14, said spring 21 exerting a tension tending to collapse said bellows 19. The latter may be connected by means of a capillary tube 22 with a temperature sensitive device 23 which, as shown, may also be in the form of a multi-tubular bulb. An adjustable abutment 24 depends from the end of the rod 20 and is in screw-threaded connection therewith for the purposes of adjustment, the free end of said abutment being in contact with the end of a valve stem 25 carrying the valve 26 which may be of any conventional type and in its illustrated form controls the connection between the inlet 9 and outlet 10 of the valve casing 7; for the purpose of facilitating the adjustment of the abutment 24 as will be more fully described hereinafter, it may be provided with a head 27 as shown. A coil spring 28 surrounds the stem 25 exteriorly of the casing 7 and exerts a tension tending to open the valve 26. The elements 17, 16 and 15 constitute temperature sensitive means carried in part by the support 5 while the elements 23, 22 and 19 comprise a second temperature sensitive means carried in part by and movable bodily with the operating means and relatively to the bellows 15 or in other words to that part of said first temperature means which is carried by the support 5. The rod 20 or its equivalent constitutes an operating member which is movable by the second bellows relatively to the yokes 5 and 11.

Assuming that the controller is used as a means whereby a certain percentage of humidity in relation to a certain temperature is to be maintained in a drying room, the installation may be as shown, by way of example, in Fig. 2 of the drawings. In this figure, 29 represents a drying room provided with manually controlled ventilating ducts 30 and heated for instance, by means of a steam coil 31 connected with a supply line 32 in which is located a temperature controller 33 automatically operated through the medium of the sensitive member 34 located within the room 29. The differential controller which, in this installation, controls the percentage of humidity in the room 29 is located exteriorly of said room on the steam line 35 which is connected with the inlet 9 and outlet 10 of the valve casing 7 and terminates within the room 29 in a humidifier 36 of any conventional construction. With this arrangement, the sensitive members 17 and 23 constitute a dry bulb and a wet bulb respectively, and are located within the room 29 in the zone thereof where the average temperature and humidity exists, the capillary tubes 16 and 22 extending in relatively close proximity to each other, to the bellows 15 and 19; in the preferred arrangement, the capillary tubes 16 and 22 are enclosed in a single protecting tube 37, the intention in either case being to locate said tubes so that both will be subjected to the same temperature conditions for the purpose to be more fully set forth hereinafter.

In the installation as illustrated and described above, the operation is as follows, it being understood that the bulbs 17 and 23, the capillary tubes 16 and 22 and the bellows 15 and 19 are preferably filled to capacity with a suitable non-compressible fluid, this arrangement producing a very powerful movement in the bellows under temperature variations. The predetermined temperature in the room 29 is automatically maintained through the medium of the bulb 34 and controller 33 which is set to secure the desired results and which operates to control the supply of steam or other heating medium to the coil 31. The adjustable abutment 24 is adjusted by means of the head 27 to permit the valve 26 to open up, under the influence of the spring 28, to an extent to supply just enough steam to the humidifier 36 to provide the desired humidity in said room 29. If now the dry bulb 17 becomes heated, it causes an expansion of the bellows 15, and pushes the movable yoke 11 upwardly relatively to the yoke 5, thereby compressing the spring 18 and carrying the bellows 19, rod 20 and adjustable abutment 24 with it and moving the latter in a direction away from the valve stem 25. This permits the spring 28 to open up the valve 26 whereby the supply of steam to the humidifier 36 is increased with a corresponding rise in the percentage of humidity in the room 29; as the dry bulb 17 becomes cooled, the valve 26 is closed down because of an opposite operation of the parts.

When, because of an increase in the percentage of humidity, the wet bulb 23 becomes heated it expands the bellows 19 and due to the fact that the spring 18 is stronger than the spring 21, thereby compresses the latter and moves the rod 20 and abutment 24 downwardly. This causes the latter to exert a pressure upon the stem 25 against the tension of the spring 28 and moves the valve 26 toward its closed position whereby the supply of steam to the humidifier 36 is decreased with a corresponding drop in the percentage of humidity in the room 29; when the wet bulb 23 becomes cooled the parts described return movements and open up the valve 26.

In other words, if the humidity increases beyond the predetermined point for which the controller is set, the evaporation of the liquid held by the wick of the wet bulb 23 is reduced and said wet bulb accordingly becomes heated and thereby actuates the bellows 19 to decrease the opening of the valve 26 which results in a reduction in the supply of steam to the humidifier 36 and a corresponding reduction in the percentage of humidity. Similarly, if the percentage of humidity falls below the predetermined point for which the controller is set, the evaporation of the liquid held by said wick is increased, thus cooling the wet bulb 23 and operating the bellows 19 in a direction to increase the opening of the valve 26 and thereby supplying an increase of steam to the humidifier which brings about an increase in the humidity in the room 29. If the temperature of the latter should vary with respect to the predetermined point the dry and wet bulbs will respond to the changes and maintain approximately the percentage of humidity for which the controller is set.

From the above description, it will be seen that the bellows 15 and 19 operate in directions opposite to each other so that as the bulb 17 becomes heated, the valve 26 is caused to open while if the bulb 23 becomes heated, said valve is caused to close and vice versa. It is apparent therefore, that any differences in temperature to which the capillary tubes 16 and 22 or the bellows 15 and 19 themselves may be subjected to will not affect the adjustment of the valve 26 because whatever temperature one capillary tube and bellows is subjected to, this temperature will, because of their proximity to each other, also affect the other capillary tube and bellows and will simply bring about movements of opposition in said bellows which perfectly balance the instrument and compensate for any temperature differences between the capillary tubes and bellows and the bulbs 17 and 23. From this it follows that only a change in bulb temperatures, sufficient to cause one bellows to overcome the resisting effect of the other, can change or affect the opening or closing of the valve 26 so that the controller is very accurate and efficient in operation.

The illustration in Fig. 3 represents the differential controller in operative combination with a steam boiler for the purpose of maintaining the level of the water therein at a substantially constant point. In this installation, the valve 26 controls the steam supply pipe 35ᵃ of a feed water pump 38 of any conventional type whereby water is supplied to the boiler and the two bulbs 17 and 23 are located in a chamber 29ᵃ which is connected by a tube 29ᵇ with the water column 39 of the boiler at a point corresponding to the water level which it is desired to maintain. The water column 39, as is customary, is provided with a gage glass 40 in which the height of water in the boiler is visible and is connected with the steam space of the latter by means of a pipe 41 and with the water space of said boiler through the medium of a pipe 42 in the conventional manner. The chamber 29ᵃ is arranged, with respect to the connection 29ᵇ, so as to form a pocket 43 below the same in which water is contained at all times and in which the bulb 23 is positioned and submerged. The bulb 17 on the other hand, extends into the chamber 29ᵃ at a point somewhat above the bulb 23 and with its longitudinal axis approximately in registry with the proposed water level, both bulbs 17 and 23, as before, being connected respectively with the bellows 15 and 19 by means of capillary tubes 16 and 22. The chamber 29ᵃ is connected with the pipe 41 by means of a branch pipe 44 through which steam is admitted to said chamber, which, in addition, is provided with an automatic air vent 45 of any convenient form which opens when it is cool to release the air from said chamber and closes when it becomes heated by the steam.

The operation of the controller, when installed as above described and illustrated in Fig. 3, is as follows: It will be assumed that the boiler is cold, in which case the bulbs 17 and 23 will be at the same temperature and that the level of the water in the boiler is below the location of the bulb 17 which is thus uncovered by water, the bulb 23 on the other hand, because of the water in the pocket 43, being submerged. The adjustable abutment 24 is now adjusted in a direction to close the valve 26, if this is not already the case, and the fire or other heat-producing means ignited. As steam begins to generate in the boiler, the air in the chamber 29ᵃ surrounding the bulb 17 will be released through the air vent 45 and replaced by steam which enters through the branch pipe 44 and contacts with the exposed bulb 17 in said chamber 29ᵃ. The bulb 17 will thus become hotter than the bulb 23 which, because it is submerged in water, is protected from the action of the steam, and thereby causes the fluid in said bulb 17 to expand and extend the bellows 15 which brings about an opening movement of the valve 26 and permits steam to enter the pump 38. The latter thus begins to pump water into the boiler and raises the water level therein and at the same time causes the water in the chamber 29ᵃ to gradually rise and cover the bulb 17. The area of the latter, which is subject to the heating influence of the steam, thus becoming gradually less, said bulb 17 is cooled and because of the resulting contraction of the fluid therein, causes a corresponding contraction of the bellows 15 and a consequent closing of the valve 26 which slows down the pump or completely stops it as the case may be.

As the level of the water in the boiler again recedes because of the formation of steam, the bulb 17 is again exposed to the action of the steam and again becomes heated and again gradually opens the steam valve to the pump and starts it. These operations are repeated as long as the boiler is in operation and serve to efficiently maintain the water in said boiler at an approximately constant, predetermined point. It will be understood that the chamber is always located some distance away from the boiler with which it is connected so that the water in said chamber will always be cooler than the water in the boiler and considerably cooler than the steam which enters the chamber 29ᵃ and that the bulbs 17 and 23 are placed close together so that when they are both covered with water, they will have approximately the same temperature. Therefore, regardless of the temperature of the water in the chamber 29ª as long as the two bulbs are immersed, the steam valve on the pump will close and as soon as the water level falls below the bulb 17 and the steam strikes it, the steam valve will start to open and start the feed water pump.

The controller is entirely automatic in operation after it has been set, and requires no special attention and is efficient in action and simple in construction. The controller is useful in many fields of operation where an automatic control is desired, the two installations illustrated being examples chosen for the purpose of explanation and without intent to define the limits of the invention. The invention, for instance, is equally well adapted for the regulation of pressures and may be efficiently utilized in this connection if desired.

Various changes in the specific forms shown and described may be made within the scope of the claims without departing from the spirit of my invention.

I claim:

1. An automatic controller comprising a stationary support, operating means including a member movably mounted upon said support, a thermo-sensitive member carried by said stationary support for actuating said movable member in one direction, and a second thermo-sensitive member mounted upon said movable-member, said second thermo-sensitive member being movable bodily with said movable member, relatively to said first thermo-sensitive member which is mounted upon said stationary support, said second thermo-sensitive member having an operative movement opposite to that of the first thermo-sensitive member and actuating said operating means in said opposite direction.

2. An automatic controller comprising a stationary yoke, a movable yoke slidably mounted thereon, an expansible and contractible member located between and engaging both of said yokes whereby the movable yoke is slidably moved relatively to said stationary yoke, a second expansible and contractile member mounted upon said slidable yoke and partaking of the movements thereof, an operating member connected with said second expansible and contractible member and movable thereby relatively to both of said yokes, the operative movements of said expansible and contractible members being in opposite directions to each other and temperature sensitive devices operatively connected with and controlling the operation of said expansible and contractible members.

3. An automatic controller comprising a stationary yoke, a movable yoke slidably mounted thereon, a thermostatic bellows between and engaging both of said yokes whereby the movable yoke is slidably actuated relatively to the stationary yoke, a spring engaging both of said yokes and opposing the operative movement of said bellows, a second thermostatic bellows mounted upon the movable yoke and partaking of the movements thereof and having an operative movement opposite to that of the first bellows, an operating member connected with said second bellows and movable with said movable yoke, said member being movable by said second bellows relatively to both of said yokes, a spring engaging said movable yoke and said second bellows and tending to collapse the same, and a pair of temperature sensitive members connected respectively with said first and second bellows.

In testimony whereof I have hereunto set my hand.

ALFRED ROESCH.